United States Patent [19]

Rojey

[11] Patent Number: 5,625,178
[45] Date of Patent: Apr. 29, 1997

[54] PROCESS AND SYSTEM USING AN ELECTROMAGNETIC WAVE TO PREVENT THE FORMATION OF HYDRATES

[75] Inventor: Alexandre Rojey, Rueil Malmaison, France

[73] Assignee: Institut Francais du Petrole, Rueil Malmaison, France

[21] Appl. No.: 555,291

[22] Filed: Nov. 8, 1995

[30] Foreign Application Priority Data

Nov. 8, 1994 [FR] France .................................. 94 13516

[51] Int. Cl.⁶ .............................. C07C 1/00; C07C 2/00; C07C 4/00; C07B 63/00
[52] U.S. Cl. .................................. 204/157.15; 204/158.2; 204/158.21
[58] Field of Search ........................... 204/157.15, 158.2, 204/158.21

[56] References Cited

U.S. PATENT DOCUMENTS

| | | | |
|---|---|---|---|
| 1,783,471 | 4/1930 | Herbsman | 204/158.21 |
| 1,950,697 | 3/1934 | Schulze et al. | 204/158.21 |
| 2,067,345 | 1/1937 | Roberts et al. | 204/157.15 |
| 5,320,726 | 6/1994 | Iwata | 204/157.15 |

FOREIGN PATENT DOCUMENTS

| | | |
|---|---|---|
| 186511 | 5/1987 | Hungary . |
| 2193220 | 2/1988 | United Kingdom . |

*Primary Examiner*—Kathryn Gorgos
*Assistant Examiner*—Eana Wong
*Attorney, Agent, or Firm*—Antonelli, Terry, Stout & Kraus, LLP

[57] ABSTRACT

A process involves subjecting a fluid containing a aqueous phase and hydrocarbons to an electromagnetic wave in order to prevent the formation of hydrates within the fluid; the electromagnetic wave advantageously is sent out intermittently in time.

15 Claims, 1 Drawing Sheet

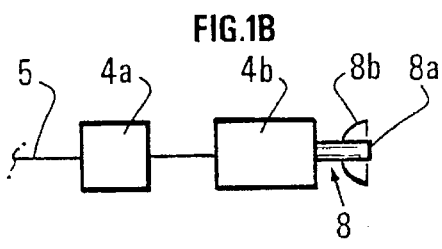
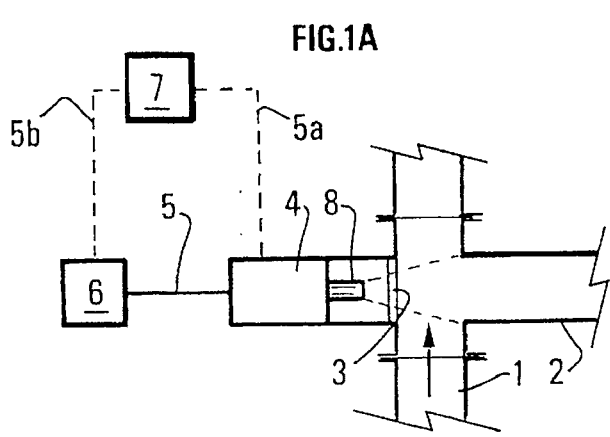
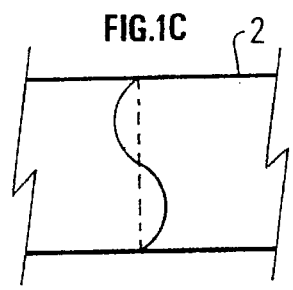
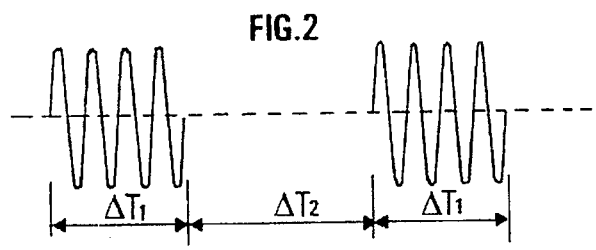
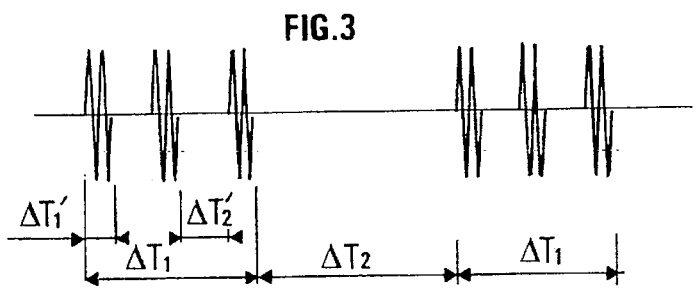
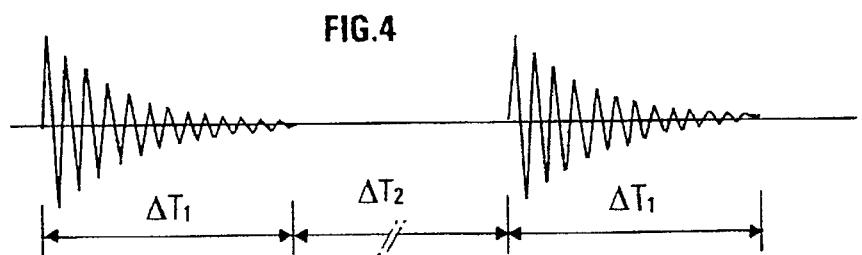
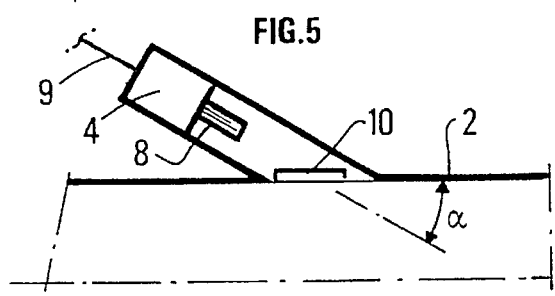
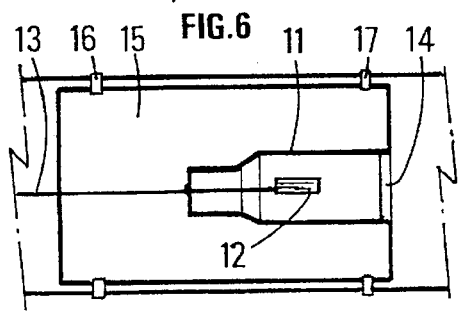

PROCESS AND SYSTEM USING AN ELECTROMAGNETIC WAVE TO PREVENT THE FORMATION OF HYDRATES

FIELD OF THE INVENTION

The present invention relates to a process and to a system allowing to inhibit the formation of crystalline bonds and to prevent thereby the formation of crystals notably in a fluid comprising several phases of different natures, by subjecting the fluid to a physical disturbance such as an electromagnetic wave.

The present invention notably applies to all the fields where one encounters fluids that can evolve in time and form crystals as a function for example to the external conditions to which they are subjected and the evolution in time of these conditions, such as temperature and pressure conditions.

The present invention can advantageously be applied to prevent the formation of hydrates, notably light hydrocarbon hydrates, in a fluid by subjecting it to an electromagnetic energy beam, for example a microwave beam.

BACKGROUND OF THE INVENTION

These hydrates can form when the water is in presence of light hydrocarbons, either in the gas phase or dissolved in a liquid phase, such as a liquid hydrocarbon, and when the temperature reached by the mixture becomes lower than the thermodynamic hydrate formation temperature, this temperature being given for a gas composition for a given pressure value.

In order to decrease the production cost of crude oil and of gas, on the investment level as well as on the operating cost level, it can be considered, for example in the case of offshore production, to reduce or even eliminate any processings applied to the crude oil or to the gas that is to be transported from the reservoir to the coast, and notably leaving all or part of the water in the fluid to be transported. The effluents are thus transferred in the form of a multiphase flow by means of a pipe to a processing platform. This procedure is particularly advantageous when offshore production is performed in a difficultly accessible area. However, it has a notable drawback due to the risk of formation of hydrates.

In fact, oil effluents containing a gas phase and a liquid phase can be made up for example of a condensate gas, a natural gas or an associated gas mixed with crude oil. They are generally saturated with water and can even contain free water in some cases.

When these effluents are transported at the sea bottom, it may happen that, as a result of the lowering of the temperature of the effluent produced, the thermodynamic conditions are likely to promote the formation of hydrates which agglomerate and block the transfer lines. The sea bottom temperature can be low, for example of the order of 3° or 4° C.

The cooling of such a mixture can lead to the formation of hydrates which are inclusion compounds, the water molecules congregating to form cages in which light hydrocarbon molecules, such as methane, ethane, propane, isobutane are trapped. Some acid gases present in natural gas, such as carbon dioxide or hydrogen sulfide, can also form hydrates in the presence of water.

Conditions promoting the formation of hydrates can also be encountered in the same way on land for lines buried only a short distance from the ground surface, when for example the temperature of the ambient air is rather low, notably in northern areas such as the arctic zones.

The agglomeration of hydrates causes the filling and the blocking of the transfer lines as a result of the formation of plugs which prevent the passage of crude oil or of gas and can lead to a production stop that is often quite long because the decomposition of the hydrates formed is very difficult to achieve and therefore brings about considerable financial losses.

In order to avoid such drawbacks, various methods are described in the prior art.

A processing intended to remove the water can be carried out on a surface platform situated in proximity to the reservoir, so that the effluent, initially warm, can be processed before the hydrate formation conditions are met on account of its cooling with the sea water. This solution however requires to bring the effluent back up to the surface prior to transferring it towards a main processing platform and to have an intermediate processing platform.

The transfer line for transporting the effluent can be insulated or even heated by means of an appropriate device, such as the device described in patent application WO-90/05,260, in order to prevent too fast a cooling of the fluids transported. However, such devices are costly and complex in their technical realization.

Patent HU-186,511 teaches that an electromagnetic wave having selected frequency values and propagation modes can be sent out to make the formed hydrates melt.

Patent SU-442,287 teaches to use an ultrasonic wave to break the hydrate crystals and to free the trapped gas thereby.

It is also well known to add permanently additives allowing to inhibit the formation of hydrates or to reduce them in the dispersed form. Such a technique is very costly.

The methods described in the prior art have notable drawbacks notably on account of the high energies necessary to act upon the crystals already formed and/or of the use of costly products which often have to be separated.

SUMMARY OF THE INVENTION

The present invention aims to propose a more simple and more economical means to prevent the formation of hydrates in an oil and/or gas effluent.

It has been discovered, which is one of the objects of the present invention, that it is possible to control the mechanism of the formation of crystals that can appear in a fluid comprising several phases, by subjecting it to an electromagnetic wave such as a microwave that will generate a disturbance in the fluid having notably the effect of preventing a well-ordered arrangement of the water molecules from being established in the fluid, that can lead to the formation of crystalline bonds at least partly responsible for the formation of crystals in time.

It is thus possible to control and to inhibit the formation of crystalline bonds by means of an appropriate selection of the parameters of the electromagnetic wave, of its form and of its emission sequence in time and/or in space.

In fact, by sending out an electromagnetic wave having an appropriate frequency, form and/or emission sequence, to a fluid likely to form hydrates, such as a mixture of water and gas, the water molecules are vibrated so as to prevent the formation of hydrogen bonds. By hindering or by preventing the organization of the water molecules in a crystal lattice that can trap hydrocarbons and form hydrates, the formation of hydrates in a fluid can be prevented.

The present invention relates to a process allowing to prevent and/or to control the formation of hydrates in a fluid containing at least an aqueous phase and hydrocarbons, by subjecting the fluid to an electromagnetic wave so as to induce a disturbance in the fluid that prevents the organization of the water molecules of the aqueous phase and the formation of crystalline bonds responsible for the formation of hydrates.

The electromagnetic wave can be sent out intermittently in time, in the form of pulses and/or of wave train sequences.

An amplitude-modulated electromagnetic wave can be sent out.

The presence of hydrates in the fluid can be detected and/or at least one thermodynamic parameter can be measured and the form and/or the emission frequency of the wave in time can be determined and/or the wave emission instants can be regulated.

The value of the wave frequency can range between 1 and 300 GHz and preferably between 1 and 10 GHz.

The fluid flows in a circular pipe and the value of the electromagnetic wavelength is substantially equal to a sub-multiple of the diameter of the pipe.

The microwave beam is emitted in a direction that is substantially close to the longitudinal axis of the pipe.

The electromagnetic wave is emitted in a direction that is substantially close to the direction of flow of the effluent from an emitter situated in the neighbourhood of a production wellhead.

Said electromagnetic wave is emitted with an emission axis forming an angle with the longitudinal axis of the pipe that is less than 45° and preferably less than 30°, from at least one emitter positioned on the periphery of the pipe.

The electromagnetic wave is emitted in various places of the pipe.

Said physical disturbance is emitted from at least one emitter situated on a mobile device in the pipe.

The present invention further relates to a system for preventing and/or for controlling the formation of hydrates in a fluid containing at least an aqueous phase and hydrocarbons, said fluid flowing in a pipe.

It is characterized in that it comprises at least one emission device for emitting an electromagnetic wave, at least one means for measuring the thermodynamic parameters, and a control and monitoring device allowing to generate signals for commanding the emission of the electromagnetic wave.

The electromagnetic wave emission device can comprise a reflector whose shape is suited for distributing the emission of the electromagnetic wave substantially over the whole section of the pipe.

The system according to the invention can comprise one or several emission devices arranged outside said pipe, the axis of each of said emission devices forming an angle that is less than 45° and preferably less than 30°.

The system can comprise a mobile device in the pipe serving as a support for the emission device.

The process and the system are advantageously used for inhibiting the formation of hydrates in a fluid containing hydrocarbons with less than five carbon atoms and water.

They are notably applied to inhibit the formation of hydrates in a condensate gas or in an associated gas and a crude oil or in a fluid containing at least a liquid hydrocarbon phase in which hydrocarbons likely to form hydrates are dissolved.

The process according to the invention has notable advantages on account of the simplicity of the device and of the low energies used for preventing the agglomeration of the hydrates.

In fact, the hydrogen bond is mainly responsible for the formation of the crystal lattice comprising water molecules that act as a hydrocarbon trap during the hydrate formation process. This bond is a low-energy bond whose formation can be prevented by vibrating the water molecules, notably by sending out electromagnetic energy intermittently in time.

Selection of the emission sequence and of the form of the wave emitted thus contributes to minimizing the energy usually used to destroy hydrate crystals already formed in a fluid by having a "preventive" effect on the crystal formation phenomenon and no longer on the crystals themselves.

Another problem that is solved is the attenuation of the effect of the physical disturbance created by the electromagnetic wave whose effect can, in some cases, be maintained according to the way the wave is emitted in the fluid.

Using the pipe as a waveguide advantageously allows not to have to take account of its shape, the propagation of the electromagnetic wave is practically independent of changes of direction or accidents, such as bends in the pipe.

BRIEF DESCRIPTION OF THE DRAWINGS

Other features and advantages of the invention will be clear from reading the description hereafter given by way of non limitative example, with reference to the accompanying drawings in which:

FIGS. 1A, 1B and 1C schematize a base device according to the invention, and the details of a possible microwave emission device, FIGS. 2, 3, and 4 show form and emission sequence examples of electromagnetic waves, FIG. 5 shows a particular arrangement of microwave emitters along a pipe, and FIG. 6 shows a mobile microwave emitting device in a pipe.

DESCRIPTION OF THE PREFERRED EMBODIMENTS

The process and the device according to the invention are based on the bringing into vibration, by means of a microwave beam, of molecules so as to prevent the formation of crystalline bonds and to control nucleation and germination phenomena which are at least partly responsible for the crystal growth. The microwave beam is advantageously sent out intermittently in time, for example, in the form of wave trains and/or of pulses.

In order to better define the invention, the description given hereafter by way of non limitative example relates to the use of a microwave beam for inhibiting the formation of hydrogen bonds mainly responsible for the formation of hydrates, for given thermodynamic conditions, in a fluid such as an oil type multiphase effluent flowing in a pipe.

For a pipe of circular section, the microwave beam is propagated advantageously according to the modes conventionally used in waveguides, for example the fundamental mode TE01 and modes TE11, TM01.

FIG. 1A schematizes an example of a device allowing the process according to the invention to be implemented.

Production effluents or multiphase effluents coming from a reservoir (not shown in the figure) pass through a flowline 1 connected to a transfert pipe 2 of circular section for example, intended to convey the effluent towards a main processing station. Line 1 is provided with a microwave-transparent window 3. A device such as a microwave generator is positioned for example opposite and behind window 3, so that the emission direction of the microwave beam coincides substantially with the longitudinal axis of transfert pipe 2, which is substantially parallel to the direction of flow of the effluent. The device includes a microwave emitter 4 contracted, by means of a cable 5, to a voltage source 6 and an antenna 8 radiating the microwave beam through window 3 towards the effluent flowing in transfer pipe 2. The emitter 4 and the voltage source 6 are connected by links 5a, 5b to a microcontroller 7 whose purpose is notably to control the microwave generation, for example its emission sequence in time.

The value of the microwave radiation frequency is selected for example, as a function of the nature of the effluent and it can range between 1 and 300 GHz, preferably between 1 and 10 GHz.

The form and the emission sequence of the microwave radiation is selected as a function of the nature of the effluent and notably of the energy necessary to break the crystalline bonds responsible for the formation of hydrates that can hinder the flow of the effluent in the pipe or transfer pipe.

The microwave radiation is advantageously sent out prior to the formation and/or the agglomeration of hydrates, so as to partly or totally prevent the formation of crystalline bonds, and the radiation emission instant can be managed by means of parameter measurements and possibly of models or data previously stored in the microcontroller.

The pulses emitted can thus for example be sent out at closer intervals if the water content increases or if an increase in the subcooling is noticed. i.e., for a given pressure, in the difference between the temperature prevailing in the flow and the temperature corresponding to the thermodynamic equilibrium.

FIGS. 2, 3 and 4 show several examples of possible forms and emission sequences of the microwave beam.

The system according to the invention is advantageously equipped with means for controlling and for measuring thermodynamic parameters, such as pressure detectors Cp and temperature detectors Ct (not shown) positioned judiciously, for example in places of the pipe where the hydrate formation probability is high, in order to monitor continuously, in real time, the thermodynamic conditions and/or the pressure drops under which the effluent transportation is achieved. Such a monitoring notably allows to adapt the parameters of the microwave beam sent in the pipe and its emission sequence as a function of these measurements.

By means of the measurements provided by pressure detector Cp, taken for example between two places of the pipe, it is possible for example to foresee the formation and/or the agglomeration of hydrates and to regulate the necessary microwave beam parameters to prevent the formation of crystalline bonds. Such measurements also allow the evolution in time of the hydrate formation to be monitored.

The parameters to be regulated are for example the energy, the frequency of the radiation emitted, for controlling the bringing into vibration of the water molecules present in the effluent and for preventing the formation of hydrogen bonds, and/or the form and the emission sequence of the wave beam.

Detectors Cp and Ct can also serve to manage the emission instants of the microwave beam and to optimize thereby the electromagnetic energy to be sent out.

These detectors are connected to the control and monitoring device 7, for example by means of a non physical link identical to the links used for remote transmission. Device 7 can be a microcomputer suited for acquiring signals coming from the detectors and/or for generating control signals, and equipped with data processing softwares. It receives the measurements from temperature and pressure detectors Ct and Cp for example and deduces therefrom the parameters of the microwaves to be sent out and possibly the emission instants of these waves, for example as a function of the real thermodynamic conditions measured.

The management of the microwave beam emission, the instant when the radiation is emitted and its sequence, as well as its parameters, can take account for example of hydrate formation models previously stored in the microcontroller.

FIG. 1B shows in detail an example of a microwave emitting device 4 which includes for example a voltage amplifier 4a and an oscillator 4b comprising for example a thermionic electron tube such as a magnetron. The microwave emitting antenna 8 can consist of a waveguide 8a and of a reflector 8b whose shape is suited to obtain for example a substantially homogeneous distribution of the beam over the whole section of pipe 2. The microwave radiation thus has an effective action on the whole of the effluent circulating in pipe 2. This shape is preferably substantially parabolic and distributes the microwaves over the whole of the effluent, in the center of the pipe as well as on the inner walls of the pipe.

Window 3 is made from a material exhibiting a low attenuation coefficient for the frequencies used and capable of protecting the antenna from all types of attacks, notably chemical attacks when the effluent is an oil type effluent. The window can thus be made for example from PVDF, which resists methane and hydrogen sulfide well.

It can also be made of synthetic sapphire, which advantageously resists high pressures.

The microwave beam can have different forms and be sent out in different sequences described in accordance with FIGS. 2, 3 and 4.

The microwaves notably have the effect of preventing the setting up of well-ordered lattices that the water molecules tend to form around the hydrocarbon molecules when the necessary temperature and pressure conditions are met.

It has been discovered that it is not necessary to exert this action continuously and that the emission of a microwave beam intermittently in time is sufficient to control the nucleation and germination phenomena so as to inhibit the formation of crystalline bonds and the growth of hydrate crystals.

The microwave beam is emitted for example in the form of wavetrains shown in FIG. 2.

In this example, identical wavetrains are emitted during a time interval $T_1$, two successive wave trains being separated by a time interval $T_2$. The emission duration $T_1$ of a wave train can range for example between 1/100th and 1/10th of a second, the time interval $T_2$ ranging for example between 1/10th and 1 second.

Each wave train can be emitted discontinuously in time itself, for example, FIG. 3 schematizes a wave train subdivided into several wave trains. A wave train has a total emission duration for example substantially equal to $T_1$, and each of the elementary wave trains has an emission duration for example equal to $T'_1$, two successive elementary wave trains being separated for example by a time interval $T'_2$. The emission duration $T'_1$ of an elementary wave train ranges for example between 1/1000th and 1/100th of a second, the time interval $T'_2$ separating two elementary wave train ranging for example between 1/100th and 1/10th of a second.

This procedure consisting in breaking up the microwave beam can be carried out several times, i.e. be repeated in time by subdividing for example each emission interval or emission duration $T'_1$ into shorter emission intervals $T''_1$, and these emission intervals can themselves be separated by intervals $T''_2$ shorter than interval $T'_2$.

The total emission duration of the microwave beam can thus represent only a very short fraction of the time during which the operation is carried out, and this fraction can range for example between 1/1000th and 1/100th.

The average power emitted can thus be lower than the peak power of a wave, which allows to increase the scope and the efficiency of the process while limiting the electromagnetic energy expended for inhibiting the formation of crystalline bonds.

Other wave forms can be used. FIG. 4 schematizes an example of an amplitude-modulated microwave beam sent out in the form of wave trains similar to the description given above.

The wave train is for example amplitude-modulated for the whole emission duration $T_1$, so as to obtain a wave having a decreasing amplitude in time.

Without departing from the scope of the invention, it is also possible to modulate the amplitude of a wave train over only part of its emission duration.

For example, the signal whose frequency ranges between 1 and 10 GHz can be amplitude-modulated by a signal of lower frequency, for example 1 to 100 MHz.

According to another embodiment variant, not shown, it is possible to frequency-modulate the wave trains.

The advantage of such wave and microwave emission sequence forms is that the value of the energy used can be adapted as a function of the fluid concerned and, on the other hand, owing to their discontinuous feature, they promote the propagation of the physical disturbance in the pipe.

Another important parameter allowing to optimize the effect created by the microwave beam in the effluent relates to the value of the frequency used. The latter can also be selected as a function of the geometry of the pipe and particularly as a function of the section of a circular pipe so as to optimize its propagation in the effluent.

In most cases, pipe 2 is made of a metallic material acting as a waveguide. This material contributes to optimizing the propagation of the electromagnetic radiation, notably by minimizing the effect of the shape of the pipe, i.e. the bends and changes in the shape or the direction of the pipe, on the characteristics of the radiation and the way it is propagated.

For a flexible pipe comprising a metallic reinforcement commonly used in oil industry for the transportation of hydrocarbons and gas, an identical behaviour is observed.

In order to optimize the propagation of the electromagnetic radiation, as well as its homogeneous distribution over the whole section of the pipe, the wavelength of the microwave beam is preferably equal to a submultiple of the diameter of pipe 2.

For a diameter of 12" for example, it is thus advantageous to select a frequency corresponding to a value of the wavelength selected from the following values: 12"; 6"; 3"; 1.5"; 0.75"...

Such a device works for example as follows: microcontroller 7 sends an emission order to the voltage source and an emission order to the emitter 4 connected to antenna 8.

The emission order is sent to the voltage source at times corresponding to the emission sequence of the electromagnetic wave beam. The microwave beam is thus sent according to a predetermined sequence, for example, as a function of hydrate formation prediction models previously stored in the microcontroller and/or as a function of the pressure and temperature measurements obtained by means of the devices Cp and Ct situated along the pipe, and transmitted to microcontroller 7 for example with the aid of remote transmission means. The emission order is advantageously sent prior to the formation of hydrates. It is thus possible to vary continuously, or in real time, the form and the emission sequence of an electromagnetic wave by taking account of the transportation conditions and of their evolution in time.

The electromagnetic radiation emitted by antenna 8 is propagated in the oil effluent by interacting with the motion of the molecules. More particularly, it has the effect of vibrating the water molecules, of preventing the formation of hydrogen bonds and of avoiding the organization of these molecules in a crystal lattice.

In some cases, it can be necessary to direct or to concentrate the radiation towards zones particularly favourable to the formation of hydrates, for example the lower points which retain water. The shape of the reflecting element positioned behind the antenna is thus suited to send the microwave beam preferably towards these critical points.

The device schematized in FIG. 5 advantageously comprises several electromagnetic wave emitters situated all along pipe 2 conveying the effluent. This non intrusive embodiment is particularly well suited for pipes of great length.

Emitter 4 is for example positioned outside the pipe and so arranged that the emission axis of the microwaves emitted by antenna 8 forms, with the longitudinal axis of the pipe, an angle alpha that is less than 45° and preferably less than 30°.

Microwave emitter 4 is connected to a power supply, not shown in the figure, by means of a cable 9 and to microcontroller 7. The microwave beam radiated by antenna 8 is transmitted to the effluent circulating in pipe 2 through the window 10 placed on the periphery of pipe 2 with an angle of emission substantially close to 30°. The radiation emitted is substantially homogeneous and uniform over the whole surface of the emission antenna.

The space between the emitter and the pipe can be filled with a material preferably identical to that constituting the emitter. The losses observed during the transmission of the microwave beam to the effluent circulating in pipe 2 are minimized thereby.

The distance between two emitters is for example, determined as a function of the nature of the effluent to be transported and/or of the transportation conditions. The emitters are for example positioned all along the pipe at regular intervals, the length of an interval ranging for example between 1 and 10 km.

The emitters can be positioned on the same side of the pipe and/or on either side of the pipe. In the latter case, the distance between two emitters is selected by taking account of possible conflicts that can result from the possible interaction between the microwave beams emitted and propagated along different axes.

FIG. 6 shows a particular embodiment of the invention in which the microwave emitter is positioned on a mobile device 15 in pipe 2, for example on a scraper commonly used in oil industry for cleaning pipes.

Such a layout allows to optimize the effect of the microwave beam at the level of the effluent, notably without being hindered by problems of attenuation of the electromagnetic wave propagated in an effluent containing an aqueous phase particularly absorptive to microwaves.

Scraper 15 is for example set in motion by means of the pressure of the effluent circulating in pipe 2 and guided by scraper rings 16, 17. It includes, in the front, a microwave emitter 11 connected for example to a voltage source by a cable 13. Cable 13 can be placed on a spooler and unwinds as the scraper advances in the pipe. An antenna 12 of a type identical to antenna 4 radiates the microwave beam in the effluent flowing in the pipe. As in FIG. 1A, the antenna can have a shape suited for transmitting the microwaves over the whole section of the pipe. The microwave beam thus reaches all of the flow, the center and the inner walls of the pipe.

The instants when the scraper is set in motion can be deduced from the temperature and pressure measurements obtained by means of detectors Ct and Cp or by means of prediction models previously stored in the microcontroller.

Without departing from the scope of the invention, the microwave emitter can be positioned in the neighbourhood of a production wellhead, the emission axis of the antenna being directed substantially in line with the well, so its to inhibit the formation of hydrates in the well.

The number of microwave emitting devices can be selected as a function of the shape of the pipe. It is advantageously possible to increase the number of emitters in places of the pipe exhibiting geometries that favour the formation of hydrates so as to intensify the effects of the microwaves.

The microwave beams can also be used simultaneously and/or during the time intervals between the sending out of wavetrains for the remote control of other devices commonly used in the oil industry.

Without departing from the scope of the invention, it is possible to emit simultaneously different wave forms and/or to combine the emission sequences of different wave forms.

The direction of propagation of the wave trains can be identical to the direction of flow of the fluid circulating in the pipe but, in some cases, these waves can be emitted in an opposite direction to the direction of flow. The latter configuration allows, notably in the case of a sea pipe connecting for example an offshore production station to an onshore terminal, to place the microwave emitting device onshore.

According to another implementation variant of the process according to the invention, the emission of microwaves can be associated with the use of chemical additives commonly used to prevent the formation of hydrates, whose purpose is to inhibit hydrates, in order to increase the efficiency of such additives and/or to decrease their concentration.

It has been proposed for example to use certain polymers to prevent the nucleation, the germination and/or the growth of hydrate crystals.

It has also been proposed to use certain surfactants to facilitate the dispersion of hydrate crystals in a liquid hydrocarbon phase. Certain solvents or certain salts are also known for their inhibiting properties.

By associating with these inhibitors the sending out of a microwave beam in a fluid as described above, it is possible to reduce the consumption of these additives and therefore to decrease the cost of the hydrate formation prevention processings and/or processings allowing to avoid he blocking of the pipe in which the fluid flows by a hydrate plug.

I claim:

1. A process for preventing formation of crystalline bonds to control the formation of hydrates in a fluid containing at least an aqueous phase and hydrocarbons which comprises subjecting the fluid to an electromagnetic wave to induce a disturbance in the fluid preventing the organization of water molecules in the aqueous phase and the formation of crystalline bonds responsible for the formation of hydrates, said electromagnetic wave being sent out intermittently in time in the form of pulses.

2. A process according to claim 1, wherein said pulses comprises wave train sequences.

3. A process according to claim 1, wherein an amplitude-modulated electromagnetic wave is sent out.

4. A process according to claim 1, wherein the hydrates present in said fluid are detected and at least one thermodynamic parameter is measured and the form of the wave in time is determined.

5. A process according to claim 1, wherein the hydrates present in said fluid are detected and an emission sequence of the wave in time is determined and emission instants of said wave are regulated to prevent formation of the crystalline bonds and growth of hydrate crystals.

6. A process according to claim 1, wherein value of the frequency of said wave is controlled to be in a range between 1 and 300 GHz.

7. A process according to claim 1, wherein value of the frequency of said wave is controlled to be in range between 1 and 10 GHz.

8. A process according to claim 1, wherein the fluid flows in a circular pipe and the wave length of the electromagnetic wave is substantially equal to a submultiple of the diameter of the pipe.

9. A process according to claim 8, wherein the electromagnetic wave is in the form of a microwave beam and is emitted in a direction along a longitudinal axis of the pipe.

10. A process according to claim 8, wherein the electromagnetic wave is emitted in various places of the pipe.

11. A process according to claim 1, further comprising flowing the fluid in a pipe and emitting the electromagnetic wave in a direction corresponding approximately to the direction of flow of the fluid in the pipe from an emitter situated in the neighborhood of a production wellhead, said fluid comprising the effluent from said production wellhead.

12. A process according to claim 1, further comprising flowing the fluid in a pipe and emitting said electromagnetic wave along an emission axis forming an angle with the longitudinal axis of the pipe that is less than 45° from at least one emitter positioned on the periphery of the pipe.

13. A process according to claim 11, wherein said electromagnetic wave is emitted from at least one emitter situated on a mobile device in a pipe in which the fluid flows.

14. A process according to claim 1, wherein the fluid contains hydrocarbons with less than 5 carbon atoms and water and the electromagnetic wave is a microwave that inhibits formation of hydrates in the fluid.

15. A process according to claim 1, wherein the fluid contains at least a liquid hydrocarbon phase in which hydrocarbons likely to form hydrates are dissolved and the electromagnetic wave is emitted into the fluid flowing in a pipe.

* * * * *